US012662311B2

(12) United States Patent

Vandemergel

(10) Patent No.: US 12,662,311 B2

(45) Date of Patent: Jun. 23, 2026

(54) AUTOMATED SMALL PARTS SHUTTLE RACKING SYSTEM

(71) Applicant: STOW INTERNATIONAL NV, Spiere-Helkijn (BE)

(72) Inventor: Luc Vandemergel, Oostkamp (BE)

(73) Assignee: STOW INTERNATIONAL NV, Spiere-Helkijn (BE)

( * ) Notice: Subject to any disclaimer, the term of this patent is extended or adjusted under 35 U.S.C. 154(b) by 359 days.

(21) Appl. No.: 18/033,985

(22) PCT Filed: Aug. 27, 2021

(86) PCT No.: PCT/EP2021/073791

§ 371 (c)(1),
(2) Date: Apr. 26, 2023

(87) PCT Pub. No.: WO2022/089812

PCT Pub. Date: May 5, 2022

(65) Prior Publication Data

US 2023/0406626 A1      Dec. 21, 2023

(30) Foreign Application Priority Data

Oct. 27, 2020    (EP) .................................... 20204205

(51) Int. Cl.
B65G 1/04          (2006.01)
(52) U.S. Cl.
CPC .................................. B65G 1/0492 (2013.01)
(58) Field of Classification Search
None
See application file for complete search history.

(56) References Cited

U.S. PATENT DOCUMENTS

| | | | |
|---|---|---|---|
| 2,612,238 A | 9/1952 | Angelicola | |
| 10,435,241 B2 | 10/2019 | Lert et al. | |
| 10,457,483 B2 * | 10/2019 | DeWitt | ................ B65G 1/0485 |

(Continued)

FOREIGN PATENT DOCUMENTS

| | | |
|---|---|---|
| WO | 2010100513 A2 | 9/2010 |
| WO | 2016199033 A1 | 12/2016 |

OTHER PUBLICATIONS

Extended European Search Report from corresponding European Patent Application No. EP 20204205.7, Apr. 16, 2021.

(Continued)

*Primary Examiner* — Mark C Hageman
(74) *Attorney, Agent, or Firm* — Workman Nydegger

(57) ABSTRACT

An automated small parts shuttle racking system includes a multitude of rows of racks, between which one or more aisles are provided. The aisle is adapted to have a shuttle propelling in a horizontal propelling direction. The racks include uprights, and the system further has more than one horizontal tracks and one or more vertical tracks. One or more of the vertical tracks is detachably connected to at least one upright, and is independently adjustable in view of the at least one upright; and the vertical tracks have at least a first and a second, mutually opposite wall. The first wall is adapted to enable the vertical propelling of a shuttle along the first wall. The first and second walls are adapted to receive pressure from the shuttle while vertically propelling, and are adapted to guide the shuttle while vertically propelling.

13 Claims, 8 Drawing Sheets

(56)          References Cited

U.S. PATENT DOCUMENTS

| | | | |
|---|---|---|---|
| 10,472,172 B2 * | 11/2019 | Goren .................. | B65G 1/1378 |
| 11,286,112 B2 * | 3/2022 | Frederiks ............. | B65G 1/0492 |
| 11,325,781 B2 * | 5/2022 | Zhu ...................... | B65G 1/0492 |
| 11,713,193 B2 * | 8/2023 | Valinsky .............. | B65G 1/0464 |
| | | | 414/267 |
| 11,999,564 B2 * | 6/2024 | Moulin ................... | B65G 1/14 |
| 2016/0355337 A1 | 12/2016 | Lert et al. | |
| 2016/0375814 A1 * | 12/2016 | Jochim .................. | B60B 19/02 |
| | | | 414/547 |
| 2018/0037410 A1 | 2/2018 | Dewitt | |
| 2020/0180863 A1 | 6/2020 | Moulin et al. | |
| 2022/0388775 A1 * | 12/2022 | Baulard ................. | B65G 1/065 |
| 2023/0303322 A1 * | 9/2023 | Hermsen ............. | B65G 1/0492 |

OTHER PUBLICATIONS

International Search Report from corresponding PCT Application No. PCT/EP2021/073791, Dec. 14, 2021.

* cited by examiner

AUTOMATED SMALL PARTS SHUTTLE RACKING SYSTEM

FIELD OF THE INVENTION

The present invention generally relates to automated small parts shuttle racking systems.

BACKGROUND OF THE INVENTION

Automated small parts shuttle racking systems are known in the art. They allow storage of a multitude of goods in racks at different levels in the racks. Devices to collect or store the goods may automatically move in the aisles between the racks as well as up and down in the racks.

Examples of such a storage system using shuttles are given in U.S. Ser. No. 10/435,241.

Shuttles moving in such automated small parts shuttle racking system require high precision of the racking elements to guarantee proper and precise functioning of the system and satisfactory and accurate movement of the shuttle inside the system. Elements of the racks not adequately positioned may cause damage to both the racks and the shuttles. Additionally, the automated small parts shuttle racking system must allow fast movement of the shuttles in the system, and congestions of shuttles within the moving tracks of the system are to be avoided. Automated small parts shuttle racking systems may suffer from vibrations caused by the movement of the shuttle within the system.

SUMMARY OF THE INVENTION

It is an object of the present invention to provide automated small parts shuttle racking systems which allow faster movement of shuttles within the system and/or movement of shuttles at lower risk of damage caused to the racking of the system and the shuttles. Automated small parts shuttle racking systems according to the invention may show a reduced intensity of vibration during operation.

The above objective is accomplished by automated small parts shuttle racking systems according to the present invention.

According to a first aspect of the present invention, automated small parts shuttle racking system is provided. An automated small parts shuttle racking system according to the invention comprises a multitude of rows of racks, between which one or more aisles are provided. The aisles are adapted to have a shuttle propelling in a horizontal propelling direction. The racks comprise uprights, and the racking system further comprises one or more than one horizontal tracks and one or more vertical tracks. One or more of these vertical tracks is detachably connected to at least one upright and is independently adjustable in view of said at least one upright. The vertical tracks comprise at least a first and a second, mutually opposite wall, the first wall being adapted to enable the vertical propelling of a shuttle along said first wall. The first and second wall are adapted to receive pressure from said shuttle while vertically propelling and are adapted to guide said shuttle while vertically propelling.

A small parts racking system refers to a racking system in which goods are stored in containers, which containers are stored in a racking system at various levels in the racking system. An automated small parts shuttle racking system is a racking system in which the goods are stored or picked from the storage locations automatically by means of shuttles, which shuttles move automatically within the racking system, more particular within the aisles between the racks of the racking system.

Aisles are provided between the multitude of rows of racks. Possibly an aisle is provided between each two rows of racks. Alternatively, pairs of rows of racks may be mounted back to back, and aisles are provided between each such pair of rows of racks. Possibly, an additional aisle is provided between a first row of racks and the first of such pairs of rows of racks, and/or an additional aisle is provided between a last row of racks and the last of such pairs of rows of racks. The shuttles of the automated small parts shuttle racking system may propel in, enter, and leave the racking system by means of these aisles.

The vertical tracks are detachably connected to at least one upright and are independently adjustable in view of the upright to which it is detachably connected. The vertical tracks are no part of the racks and are mountable independently from the racks. The vertical tracks in general do not carry load of the goods being stored in the racks of the racking system. The vertical track is connected to one, possibly to two, uprights. These uprights are part of the racking and do carry load of the goods stored in the rack. In case the vertical track is connected to two uprights, preferably one upright is connected at each side of the profile of the vertical track. However, the position of the vertical track can be adjusted in view of the position of the upright or uprights. The position of the vertical track can be adjusted in X-, Y-, and/or Z-direction in view of the position of the upright or uprights to which it is detachably connected. The Y-direction is the perpendicular, hence longitudinal direction of the vertical track. The X-direction is the horizontal propelling direction in the aisle, while the Z-direction is perpendicular to both the X- and Y-directions, i.e. the horizontal direction perpendicular to the horizontal propelling direction in the aisle. The vertical tracks may be connected to the uprights once they are oriented within their narrow tolerances.

The vertical tracks may be vertical mounted within narrow tolerances, i.e. with an angle with the sounding line being within tolerances of maximum+/−3 mm inclined to this sounding line. This in contrast to the uprights which are oriented according to the sounding line within tolerances typically defined by the norm FEM 9.832. Such tolerances may not be acceptable for shuttles to propel accurately and swiftly within the racking system.

As the shuttles propel in vertical direction using the vertical track, the positions of different vertical tracks can be tuned more precisely one to the other, thereby providing very accurate propelling paths for the shuttles. The less accurate tolerances with which the racks are mounted, do not play a role in the accurateness of the propelling paths of the shuttles. Accurate positioning of the vertical tracks may to some extent reduce the vibrations caused in the racks by the shuttle propelling in vertical and horizontal direction in the aisles and may allow higher propelling speeds used.

The vertical tracks comprise at least a first and a second, mutually opposite wall. These two opposite walls may be provided by two separate vertical elements. According to some embodiments, the first and second mutually opposed walls may form part of a profile. The track hence has a profile. Having a profile means that a cross section of the vertical track according to a plane perpendicular to the longitudinal direction of the track has a given shape, being the profile. For the vertical tracks, the profile, i.e. cross-sectional profile, comprises at least two mutually opposite walls. The vertical track may have a profile comprising at least 3 walls, of which 2 are substantially parallel to each other. The profile may have a web, with on two sides of the web two flanges extending from the web at one of the webs surfaces, thereby defining the inner surface and the recess of the profile.

The uprights may be standard racking uprights, with a typical profiled cross section such as a U, C, C+ or Omega profile.

The racks may further comprise additional elements, typically being profiles, such as horizontal load beams, horizontal braces and diagonal braces. They together are mounted such that they form bays to receive the goods to be stored.

Horizontal load beams and horizontal tracks are distinguished profiles. Both preferably are profiles, but both serve a different purpose. The horizontal load beams serve to support the goods stores in the multilevel storage system. The horizontal tracks serve to allow shuttles to travel horizontally within the multilevel storage system along a horizontal surface being one of the walls of the profile. Load beams and horizontal tracks may be coupled to each other. Vibration damping material and/or leveling means such as shim plates may be provided between the horizontal tracks and the frames. In the alternative the horizontal load beam may function as the horizontal track simultaneously. The automated small parts shuttle racking system comprises preferably more than one horizontal track, such as e.g. 2, 3, 4, 5, 6, 7, 8, 9, 10, 11, 12, 13, 14, 15 or more horizontal tracks. All pairs of adjacent horizontal tracks may be equidistant one from the other in vertical direction, or some or all may be at varying distances in vertical direction.

Preferably two vertical tracks are oppositely aligned at the two walls of the aisle. Two vertical tracks are provided, each of the two being present in the wall of two opposite rack, which walls defining the aisle. The two vertical tracks are aligned, meaning that they are facing one another such that a shuttle may propel vertically using the two vertical tracks at the same time. Most preferred, the two vertical tracks are at the same depth within the aisle, facing each other. The imaginary horizontal line coupling these vertical tracks center to center is preferably about perpendicular to the walls of the aisle. Here about perpendicular means that the line may deviate over a horizontal deviation of +/−3 mm from the perpendicular to each of the walls.

Two horizontal tracks are oppositely aligned at the same level or height at the two walls of the aisle. Two horizontal tracks are provided, each of the two being present in the wall of two opposite rack, which walls defining the aisle. The two horizontal tracks are aligned, meaning that they are at the same height or level in the aisle, such that a shuttle may propel horizontally using the two horizontal tracks at the same time. Most preferred, the two surfaces of the two tracks, on which surfaces the shuttle is to propel horizontally, are coplanar.

According to some embodiments, the first wall may comprise a profiled surface adapted to receive a vertical propelling wheel of a shuttle.

As an example, the first wall may comprise a toothed surface, such as a toothed bar, which is adapted to receive a gearwheel of a shuttle. As another example, the first wall may comprise a profiled surface, the shuttle comprising a wheel with profiled outer circumference, which profiled outer circumference matches with the profiled surface of the first wall.

According to some embodiments, between each of the vertical tracks and the at least one upright detachably connected to this vertical track, vibration damping material may be provided.

Such vibration damping means may e.g. be rubber silent blocks or sheets or may be springs. The provision of this vibration damping means may reduce the vibration caused in the racks due to a shuttle using this vertical track to propel in vertical direction. Such vibrations may lead to accidentally moving of stored goods.

The vertical track and the upright may be detachably connected by means of bolts, or by any other mechanical connection means, provided this mechanical connection means allows adjustment of the position of the vertical track in view of the upright.

According to some embodiments, the profile of the vertical tracks may comprise a third wall adapted to limit the movement of the shuttle in a horizontal direction perpendicular to the horizontal propelling direction in the aisle.

This third wall may be the web of a profile, the first and second wall being the flanges of the profile. The third wall may be adapted to receive pressure and to provide counterpressure to a pressure applying guiding means present on the shuttle propelling in vertical direction.

According to some embodiments, the first and/or second wall may be adapted to limit the movement of the shuttle in a horizontal direction perpendicular to the horizontal propelling direction in the aisle.

As an example, one or both of the first and second wall may be provided with a longitudinal profile, i.e. in the longitudinal direction of the wall, like a rill or a protrusion or alike. The shuttle may have a means, e.g. a profiled pressure applying wheel, which wheel has a profiled circumference, matching the longitudinal profile on the first and/or second wall.

As another example, one or both of the first and second wall may be provided with an indentation, optionally provided by two longitudinal protrusions. An element of the shuttle may be forced to follow this indentation such as by sliding or rolling in the indentation, thereby preventing the shuttle to move in a horizontal direction perpendicular to the horizontal propelling direction in the aisle.

Limiting or even preventing the movement of the shuttle in a horizontal direction perpendicular to the horizontal propelling direction in the aisle, may provide a shuttle to vertically propel centralized in between two opposite tracks, hence racks, when two tracks are provided along the aisle at the different sides of the aisle. Preferably such two tracks are mutually opposite and well aligned one to the other.

According to some embodiments, the horizontal tracks may be connected to the vertical tracks.

According to some embodiments, the horizontal tracks may be free of connection with the at least one upright to which the vertical track is detachably connected.

Possibly, the ends of the horizontal tracks may be connected to the vertical tracks. The wall of the vertical track to which the horizontal track is coupled, is preferably the wall closest to the horizontal track. The horizontal track preferably does not bridge the gap between the first and second wall of the profile of the vertical track. The horizontal track crosses and/or extends beyond only one of the walls, i.e. the one to which it is connected.

The most critical point in the racking system for the tracks and the shuttle to be aligned accurately, are the positions where the shuttle is to couple to the vertical tracks in order to start an upward or downward propelling. In order to allow the shuttles to pass horizontal tracks at different levels in the aisle, the horizontal tracks need to be interrupted to allow the vertically propelling system of the shuttle to pass at the horizontal position where the vertical tracks are present. By connecting the ends of the horizontal track to the vertical tracks, the very accurate position of the vertical tracks is implied to the ends of the horizontal tracks as well. The position of the ends of the horizontal tracks in Y- and Z-direction can be made accurately and with the same precision as the positioning of the vertical track. As such, the possibility on malfunctioning of the shuttle within the racking system may further be reduced. This is even more the case when the horizontal tracks are not connected to the uprights to which the vertical tracks are detachably connected.

The horizontal tracks, e.g. the ends of the horizontal tracks, may be connected to the vertical track by bolts or another mechanical fixation means. The horizontal tracks, e.g. the ends of the horizontal tracks, may be connected directly to the vertical track, e.g. by bolts and alike, or the horizontal and vertical track may be connected one to the other making use of a connection piece or coupling element.

The horizontal tracks, e.g. the ends of the horizontal tracks, may be connected to the first and/or second wall of the vertical track. Alternatively, the horizontal tracks are connected to an additional wall of the vertical track profile, e.g. to a fourth and fifth wall. Such fourth and fifth wall preferably are walls parallel to the third wall, and may connect to the first respectively the second wall at the opposite side as the one with which the first and second wall is connected to the third wall. The fourth and/or fifth wall may be oriented towards the recess of the profile, which recess is defined by the first, second and third wall. Alternatively, the fourth and/or fifth wall may be oriented away from the recess of the profile.

If one or more further uprights are present between a pair of uprights detachably connected to respective vertical tracks, the horizontal tracks being coupled to these vertical tracks may be connected to at least some, possibly all, of these further uprights.

According to some embodiments, between the vertical tracks and the horizontal tracks vibration damping material, may be provided.

Such vibration damping means may e.g. be rubber silent blocks or sheets, or may be springs. The provision of this vibration damping means may reduce the vibration caused in the racks, which may lead to accidentally moving of stored goods, due to a shuttle using this horizontal track to propel in horizontal direction.

According to some embodiments, in between the horizontal tracks and the racks, levelling means may be provided to adjust the position of the horizontal tracks.

Leveling means may e.g. be shim plates and alike. They may be inserted between the horizontal track and elements of the racks, e.g. uprights or load beams. They may be used to fill openings between the horizontal track and the rack element or may be used to tune and adjust the position of the horizontal track in the aisle. They may compensate the deviation in Z-direction of the rack relative to the vertical tracks.

According to some embodiments, two horizontal tracks are connected to a vertical track, each at one side of the vertical track, the outer ends of the horizontal tracks may define a single gap having a width of at most 50 mm.

A single gap means that between the one end of the one horizontal track and the one end of the second horizontal track, only one gap is present which spans the whole distance between the two ends. The width is the distance between the outer end of the one horizontal track to the outer end of the other horizontal track.

The small gap used has the advantage that, for shuttles horizontally passing the gap while not to show any bouncing action, smaller wheels may be used. Further, the axial distance between two adjacent wheels in a pair of wheels, may be chosen smaller. At least one contact point of the pair of wheels propelling on the horizontal tracks, must be guaranteed at all times, in order to prevent bouncing of the shuttle. As the gap to be bridged is small, the interaxial distance of the wheels in the pair of wheels can be reduced to the width of the gap. Meanwhile, shuttles having their driving axes and supports of their vertically propelling system vertically aligned while propelling in vertical direction, may pass this rather narrow gap as the width of the gap needs only to be as large as the largest diameter of an axes or support which are to pass the gap.

According to some embodiments, at the outer ends of the horizontal tracks, the horizontal tracks may be downwards inclined or with a rounded edge.

Downwards inclined ends or ends being provided with rounded edges, may improve the smoothness of shuttles passing the gap in horizontal direction, and reduces the induced vibration on the racking system.

According to some embodiments, the lowermost horizontal tracks in the rack system may abut one to the other in the horizontal propelling direction.

Abutting, being touching each other or having a tiny gap between the edges due to tolerances used, like gaps with width of less than 2 mm, allow the shuttles to be able to propel over the abutting ends at a higher speed. The lowermost horizontal tracks are used most, because basically all goods going in and out of the racking system and carried by the shuttles, need to pass this level. At the lowermost horizontal track, no shuttles need to pass the horizontal track further downwards, hence any gap between the ends of the horizontal tracks at the positions of the vertical tracks can be omitted. The shuttles on this level may propel horizontally faster which also cause less risk for congestion in the aisle.

According to some embodiments, the racking system further may comprise one or more mezzanine constructions in front and/or at the back of the aisle of the racking system for the shuttle entering or leaving the aisle.

A mezzanine construction means an extension of the racking system beyond the last upright of the racking system in an aisle, extending into extended horizontal tracks or a horizontal floor, such that, at a level different from ground level, a shuttle can be positioned outside the aisle while being supported on horizontal tracks or a horizontal floor. Such mezzanine construction, typically at the front or in the back of the aisle, allows the shuttles to leave the aisles at a level different from ground level. The mezzanine constructions may be used to temporarily park a shuttle, in order to allow other shuttles to pass or to arrive at the track level of this mezzanine construction. As such the risk on congestions within the racking system may be reduced.

According to some embodiments, the horizontal tracks used for entering and/or leaving the aisle may be provided with a ramp aligned to the entry level of the aisle.

At the positions where the horizontal tracks leave the aisle, a vertical difference with the entry level, such as the ground level or mezzanine level, may have to be bridged. The ramps used to bridge this distance hence are to gradually bring the shuttle from the floor or mezzanine level to the entry level of the aisle (the vertical level of the horizontal track) or vice versa. The ramps may be adjustable such that during installation of the racking system, the ramps may be adjusted to the unevenness of e.g. the concrete floor or floor level on which the racking is installed.

According to some embodiments, the racking system may comprise at least one walkway spanning the aisle at a height above ground level.

One or more walkways may be provided at one or more levels of the racking system, allowing operators to enter safely the racking system in case an intervention or maintenance is to be given to the racking system.

The independent and dependent claims set out particular and preferred features of the invention. Features from the dependent claims may be combined with features of the independent or other dependent claims, and/or with features set out in the description above and/or hereinafter as appropriate.

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

The same reference signs refer to the same, similar or analogous elements in the different figures.

DETAILED DESCRIPTION OF EMBODIMENT(S)

The present invention will be described with respect to particular embodiments. It is to be noticed that the term "comprising", used in the claims, should not be interpreted as being restricted to the means listed thereafter; it does not exclude other elements or steps. It is thus to be interpreted as specifying the presence of the stated features, steps or components as referred to, but does not preclude the presence or addition of one or more other features, steps or components, or groups thereof. Thus, the scope of the expression "a device comprising means A and B" should not be limited to devices consisting only of components A and B. It means that with respect to the present invention, the only relevant components of the device are A and B.

Throughout this specification, reference to "one embodiment" or "an embodiment" are made. Such references indicate that a particular feature, described in relation to the embodiment is included in at least one embodiment of the present invention. Thus, appearances of the phrases "in one embodiment" or "in an embodiment" in various places throughout this specification are not necessarily all referring to the same embodiment, though they could.

Furthermore, the particular features or characteristics may be combined in any suitable manner in one or more embodiments, as would be apparent to one of ordinary skill in the art.

Figures 1A, 1B:
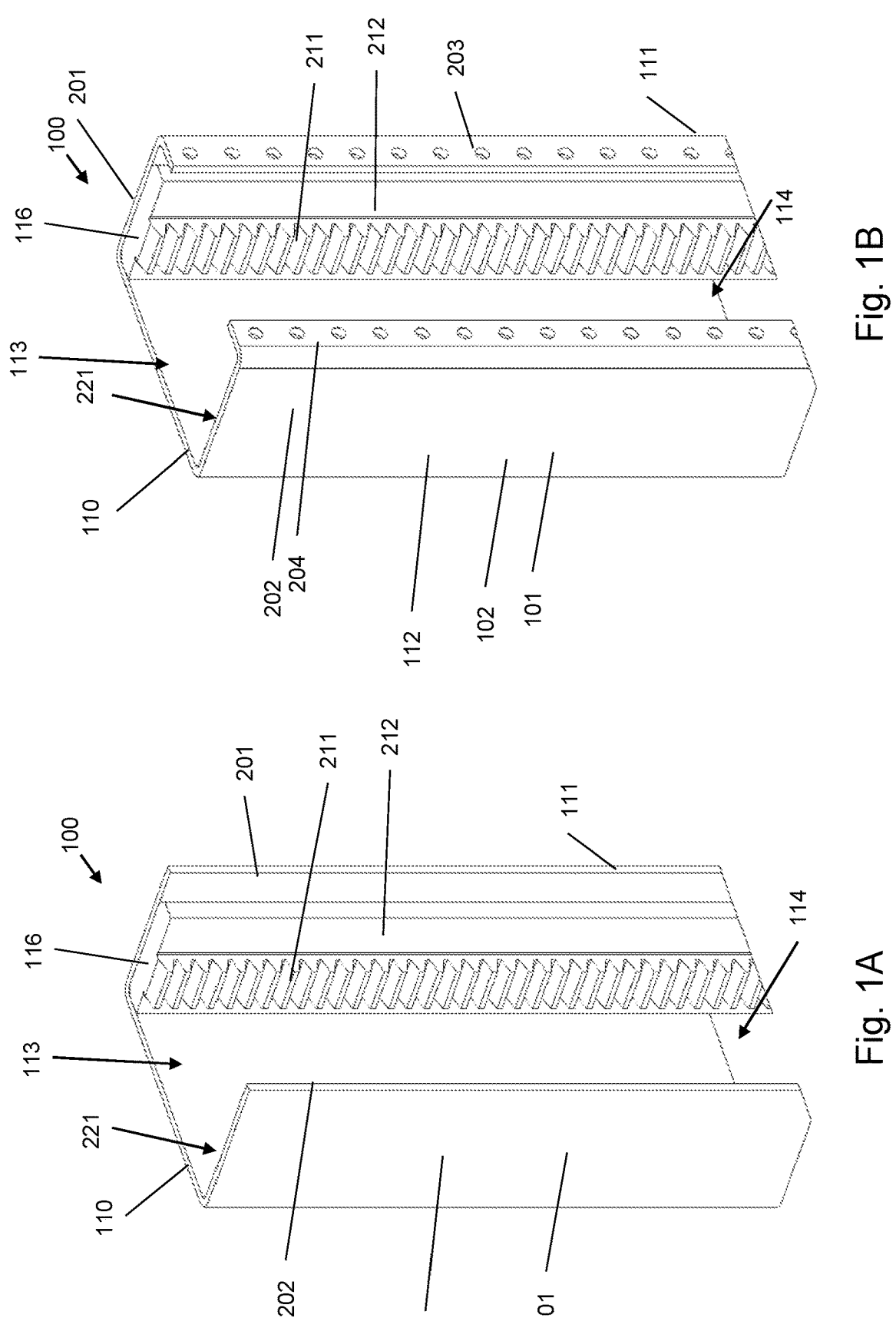
FIG. 1A to FIG. 1F are schematically views of vertical tracks being part of an automated small parts shuttle racking system according to the invention.

A vertical track 100 having a profile is shown in FIGS. 1A to 1F. FIG. 1A shows a vertical track 100 having a U-profile 101. The U profile 101 comprises a web 110 and two mutually opposed flanges 111 and 112. Flange 111 provides the first wall 201 while the second flange provides the second wall 202. The first wall 201 is adapted to enable the vertical propelling of a shuttle along this first wall. The first 201 and second wall 202 are adapted to receive pressure from a shuttle while vertically propelling and are adapted to guide said shuttle while vertically propelling.

The first wall 201 has a profiled surface 211 which is part of a toothed bar 116, which surface 211 is adapted to receive the teeth of a gearwheel being part of a shuttle climbing up and down the toother bar, hence up and down the vertical track 100. Adjacent the profiled surface 211, the first wall 201 has a flat surface 212. This flat surface 212 may be contacted by a distance wheel which may be coaxial with the gearwheel and having a larger diameter as compared to the largest diameter of the gearwheel. The distance wheel may limit the penetration depth of the gearwheel in the toothed bar. The second wall 202 has a flat surface 221 and is adapted to contact a press wheel of a shuttle climbing up and down the toother bar, hence the vertical track 100. The first and second wall 201 and 202, and the inner surface 113 of the web define a recess 114 of the profile.

The flat surface 221 and the surfaces 212 and 211 are adapted to receive pressure, in horizontal direction, from the shuttle while vertically propelling, and are adapted to guide the shuttle while vertically propelling. The inner surface 113 of the web 110 may contact a guiding means of a shuttle when vertically propelling. This guiding means may prevent the shuttle to move sideways over a too large distance.

Figure 1D:
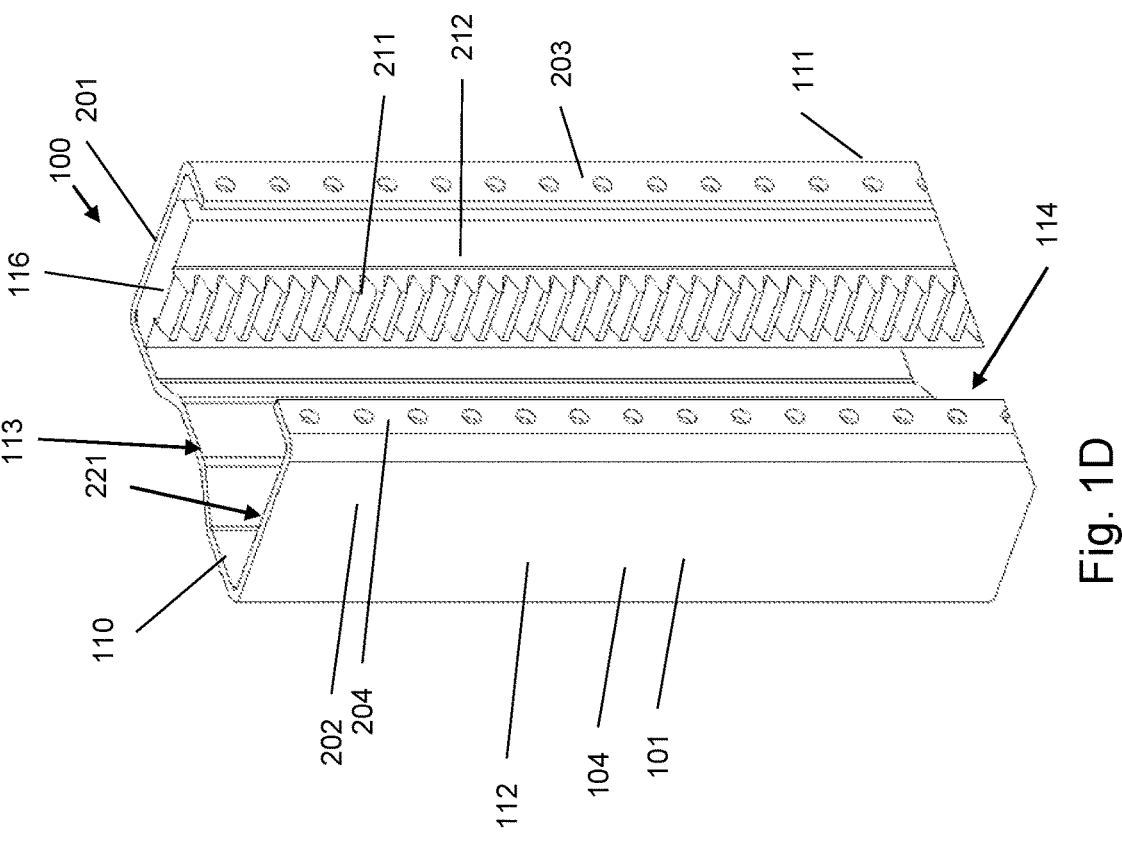
Figure 1C:
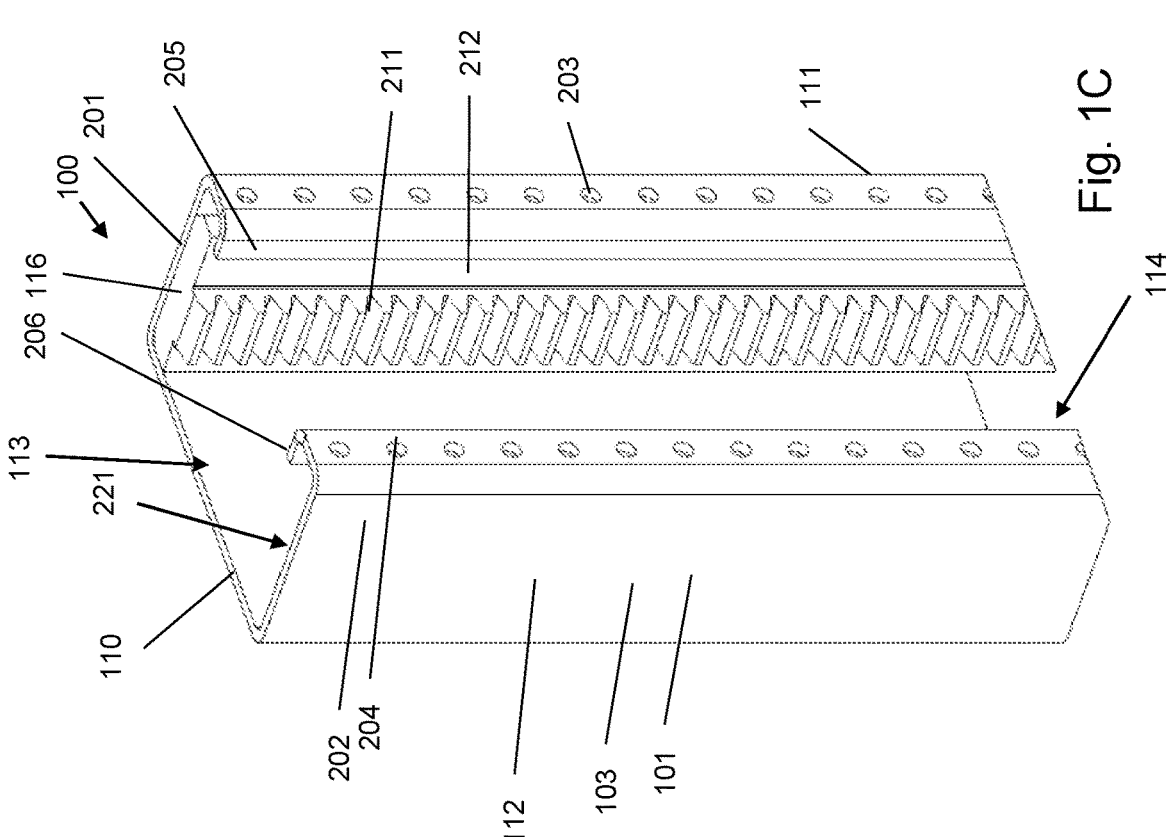
Figures 1E, 1F:
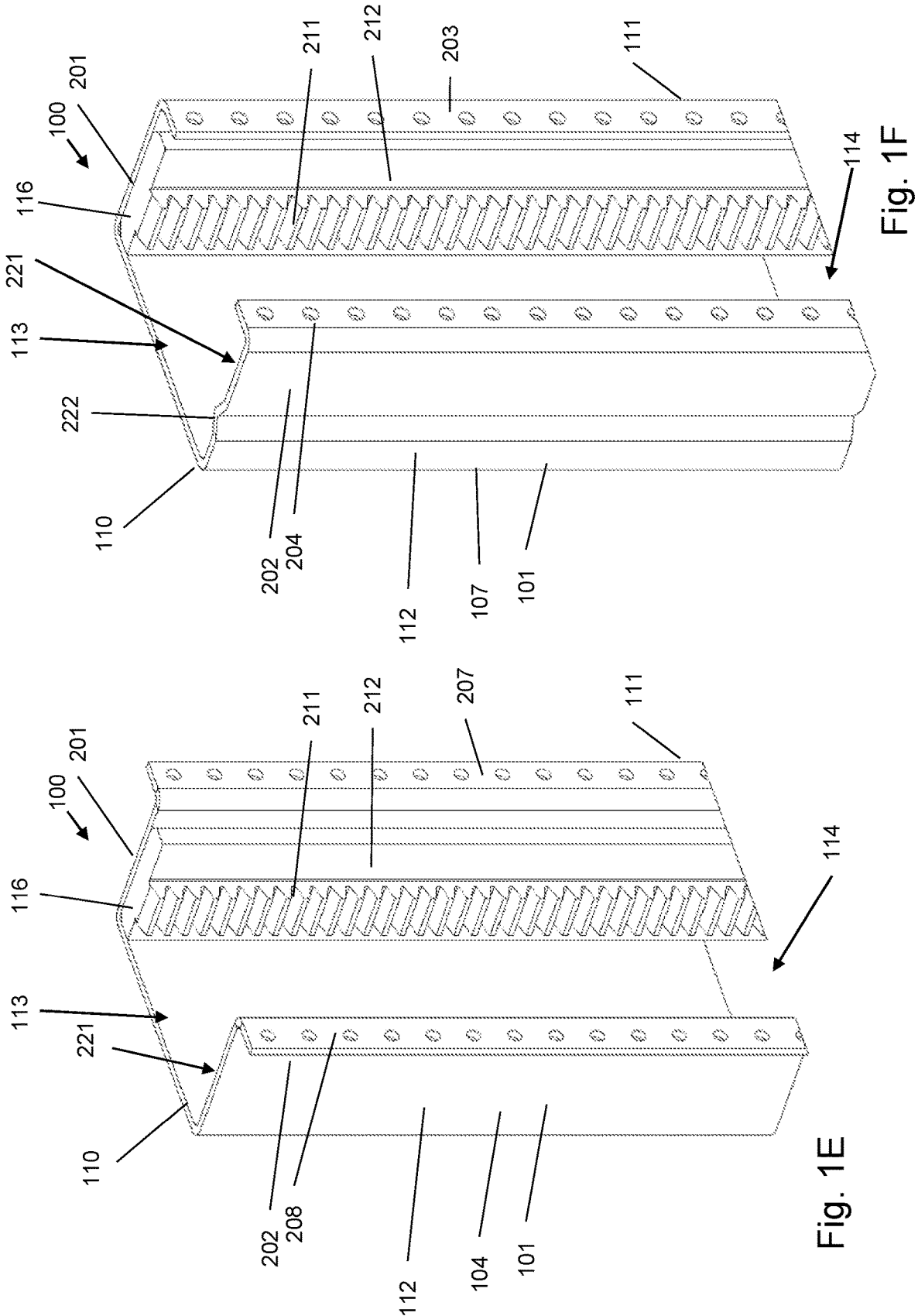
Figure 6:
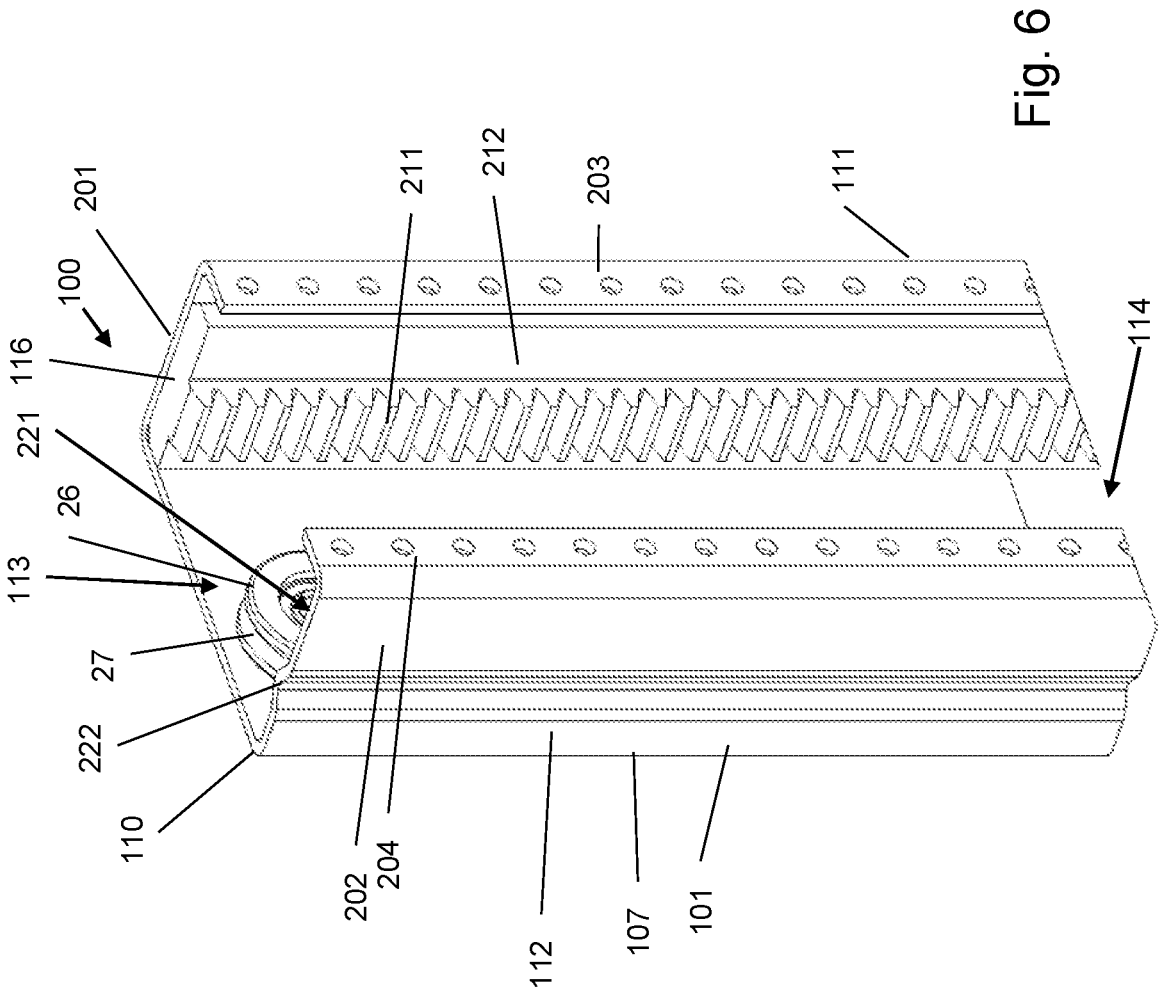
FIG. 6 is a schematically view of a profiled press wheel contacting a vertical track of FIG. 1F.

Alternative profiles are shown in FIGS. 1B to 1F. FIG. 1B shows a C-profile 102, which additionally to the U-profile further has two additional walls 203 and 204, each extending the walls 201 respectively 202 under an angle of 90°, and being oriented towards each other. FIG. 1C shows a C+-profile 103, which additionally to the U-profile has two additional walls 203 and 204, each extending the walls 201 respectively 202 under an angle of 90° and being oriented towards each other. The C+ profile further has two additional walls 205 and 206, each extending the walls 203 respectively 204 under an angle of 90° and being oriented inwards the recess 114. FIG. 1D shows a sigma-profile 104, which additionally to the U-profile further has two additional walls 203 and 204, each extending the walls 201 respectively 202 under an angle of 90°, and being oriented towards each other. The sigma profile further has a web which is provided with an inwards bulge. FIG. 1E shows an omega-profile 105, which additionally to the U-profile further has two additional walls 207 and 208, each extending the walls 201 respectively 202 under an angle of 90° and being oriented away from each other. FIG. 1F shows a C-profile 107, which additionally has a non-flat surface 212. The surface 212 is provided with a rib, a bulge or a protrusion 222 directed inwards the recess 114 of the profile. This protrusion will serve, as shown in FIG. 6, to guide a profiled press wheel 26.

In all profiles, the surfaces 211 and 212 are provided by a toothed bar having an adjacent flat surface, which toothed bar can be positioned and adjusted inside the vertical track 100.

Figure 2:
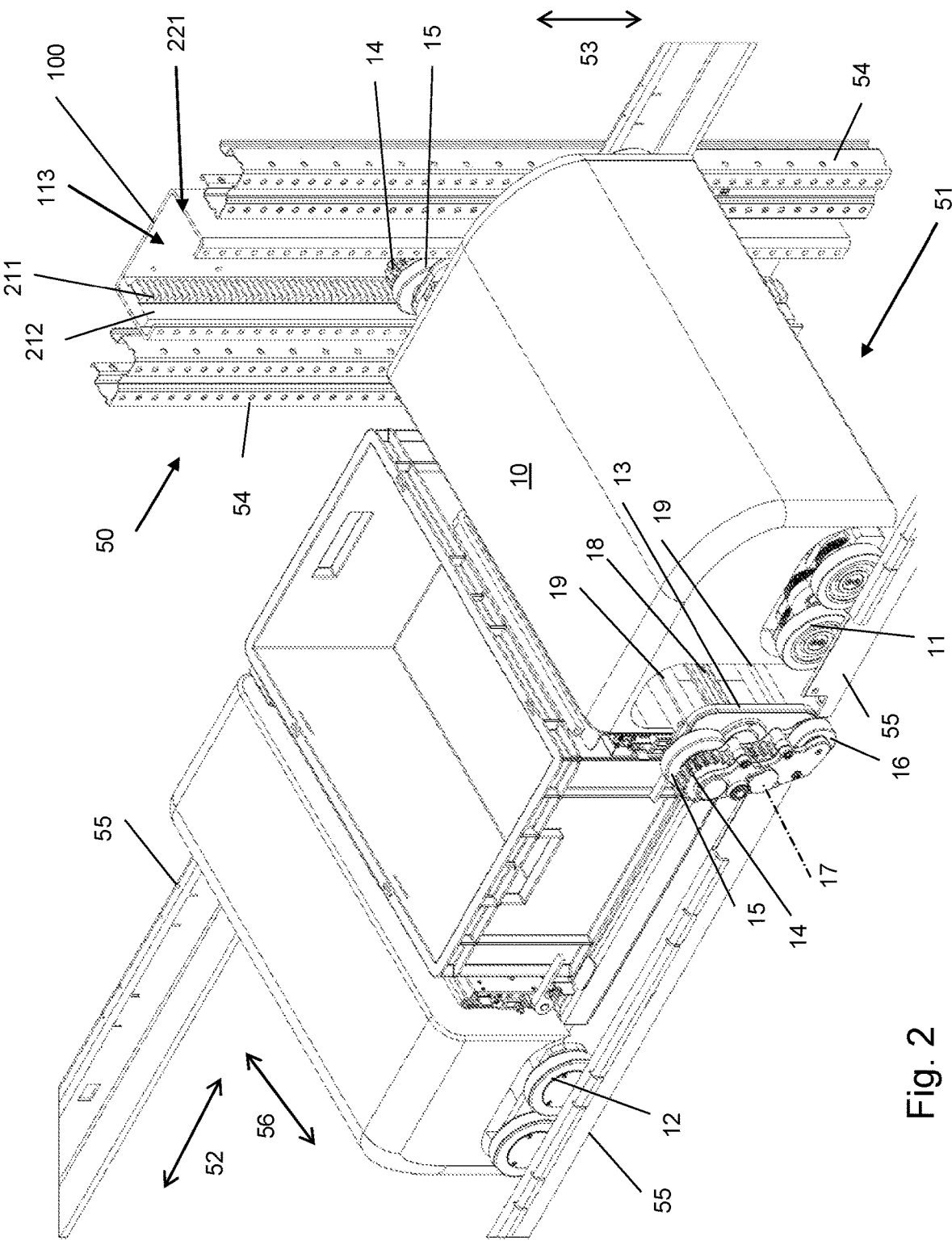
FIG. 2 is a schematically view of a shuttle propelling in an automated small parts shuttle racking system according to the invention.

In FIG. 2, a shuttle 10 is shown which propels in vertical direction in an automated small parts shuttle racking system 50. The automated small parts shuttle racking system comprising a multitude of rows of racks, between which one or more aisles 51 are provided. The aisle 51 is adapted to have a shuttle propelling in a horizontal propelling direction 52. The racks comprising uprights 54. The vertical track 100 is detachably connected in this embodiment to two uprights 54, one at each side of the vertical track 100. In FIG. 2, the vertical track 100 is a C-profiled vertical track, but other profiled vertical tracks as shown in FIGS. 1A to 1F may be used. The vertical track 100 is independently adjustable in view of the uprights 54. For clarity of the FIG. 2, only one of the two vertical tracks 100 is shown in which the shuttle is to climb in vertical direction 53. The shuttle 10, in the position shown, is still resting on the horizontal tracks 55 with its wheels 11 and 12. At each side of the shuttle 10, a vertical wing 13 is inserted in the recess 114 of a profiled of a vertical track 100. The wing 13 is carried by two support bars 19, and a drive axis 18 is coupled to the driving mechanism at the top of the wing 13.

The gearwheel 14 being part of a shuttle 10 climbing up and down the toother bar, hence the vertical track 100, grips into the toothed bar 211 of the vertical track 100. Adjacent the profiled surface 211, the first wall 201 has a flat surface 212. This flat surface 212 may be contacted by a distance wheel 15 which is coaxial with the gearwheel 14 and having a larger diameter as compared to the largest diameter of the gearwheel 14. The second wall 202 has a flat surface 221 and is adapted to contact a press wheel 16 of a shuttle 10 climbing up and down the toother bar 211, hence the vertical track 100. The gearwheel 14, the distance wheel 15 and the press wheel 16 press against the walls of the vertical track 100. The shuttle 10 can extend its vertical wings 13 in a horizontal direction 56, causing at least the gearwheel 14, distance wheel 15 and press wheel 16 to be adapted to be inserted or retracted in or out of the recess 114 of the vertical rack 100. The gearwheel 14, distance wheel 15 and press wheel 16 can pivot around a pivot axis 17. In a first upright position, the gearwheel 14, distance wheel 15 and press wheel 16 do not contact the vertical track, while pivoted to a second position, they do contact the corresponding surfaces, allowing to press against these surfaces and climb up or downwards by rotating the gearwheel 15. In order to allow the wheels 11 and 12 to cross the horizontal tracks 55 during vertical propelling, the wheels 11 and 12 can be retracted towards the shuttle 10 in direction 56.

Figures 3A, 3B:
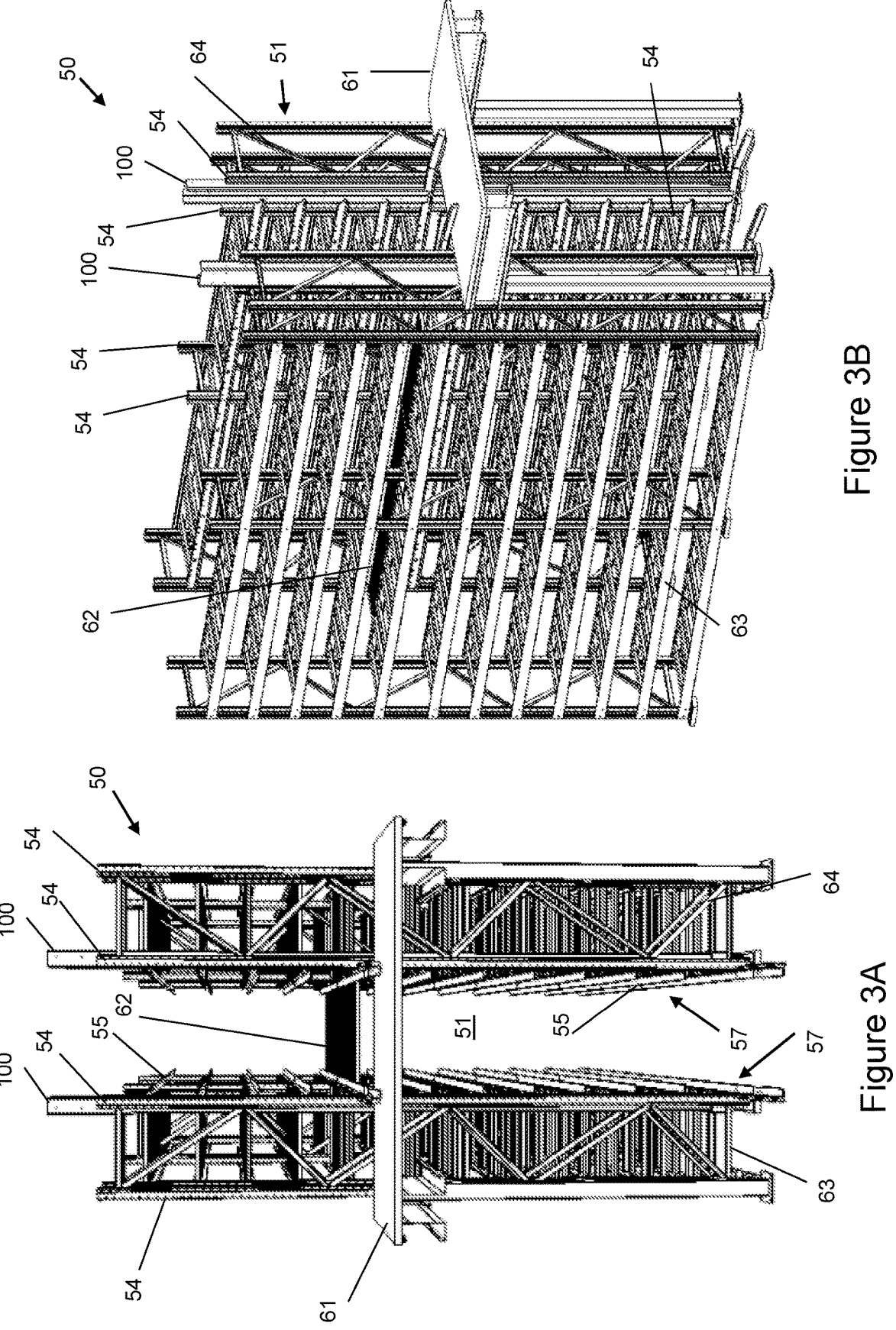
FIG. 3A and FIG. 3B are schematically views of an automated small parts shuttle racking system according to the invention.

FIGS. 3A and 3B show in general an automated small parts shuttle racking system 50, where aisles 51 are provided between two walls 57. Each wall 57 is constructed using uprights 54 and a number of horizontal beams 63 and diagonal beams 64. Between two adjacent uprights 54, a vertical track 100, is provided. At the end of the aisle 51, well above ground level, a mezzanine 61 is provided, as well as a walkway 62. In this embodiment, the automated small parts shuttle racking system comprises 12 equidistant horizontal tracks.

Figure 5:
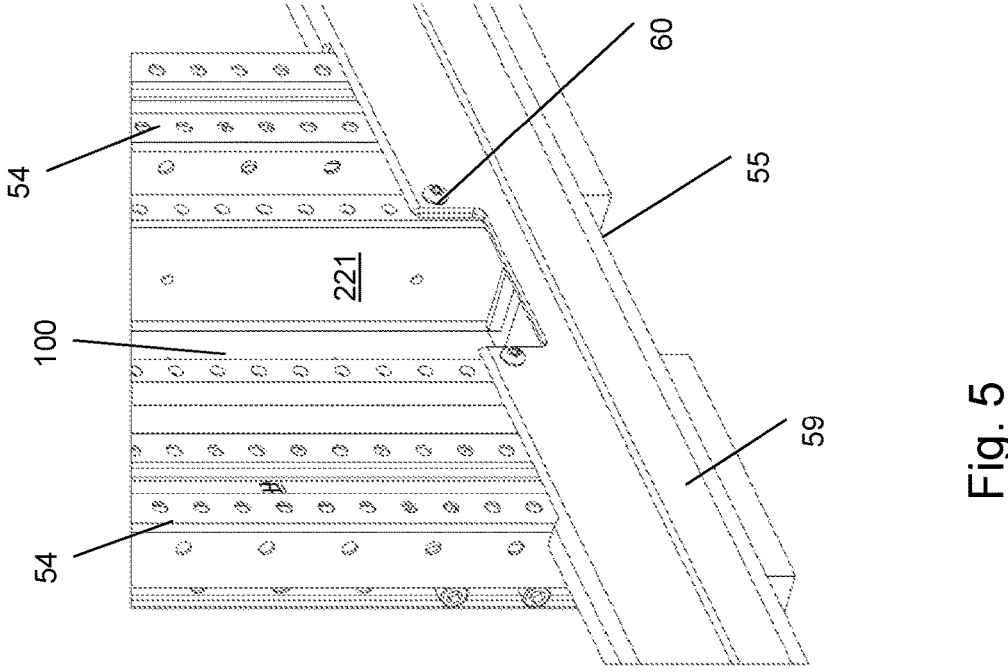
FIG. 4 and FIG. 5 give details of an automated small parts shuttle racking system according to the invention.
Figure 4:
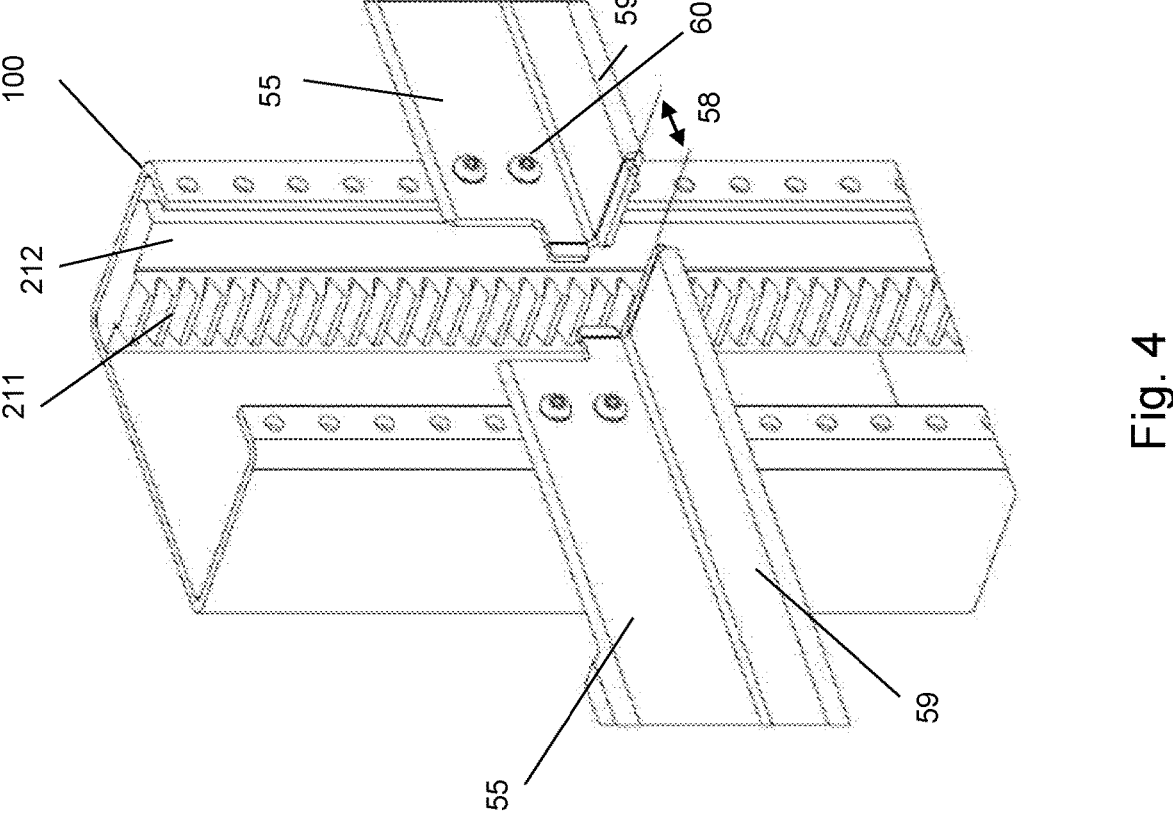

At each level of the racking, except the lowest or ground level, the vertical tracks 100 and the horizontal tracks 55 are bolted to each other, as shown in FIG. 4 (for clarity the adjacent uprights are omitted in FIG. 4). The horizontal tracks 55 are bolted to the vertical tracks 100 using bolts 60 and nuts. At the vertical tracks 100, the horizontal tracks are interrupted and a small gap 58 is provided to allow the support bars 19 and drive axis 18 of a shuttles to pass in vertical propelling direction. As shown in FIG. 5, at the level of the lowest horizontal track, typically ground level, no such gap is present. The surface 59 on which the wheels 11 and 12 propel horizontally is not interrupted. As such the shuttles 10 running on the lowest level can run on higher speed, as no gaps need to be bridged, hence no risk for bumping is present. As is visible in FIG. 5, the horizontal track and vertical track are bolted one to the other using bolts 60 and nuts.

FIG. 6 gives a view on how a profiled press wheel 26 will contact the non-flat surface 212 having a protrusion 222. The profiled press wheel has a profile like a groove or recess 27 around its circumference. The protrusion 222 and recess 27 match and as such, during vertical propelling, the recess will run over the protrusion, which avoids horizontal drifting of the shuttle while vertically propelling in the vertical track 107.

Figure 7:
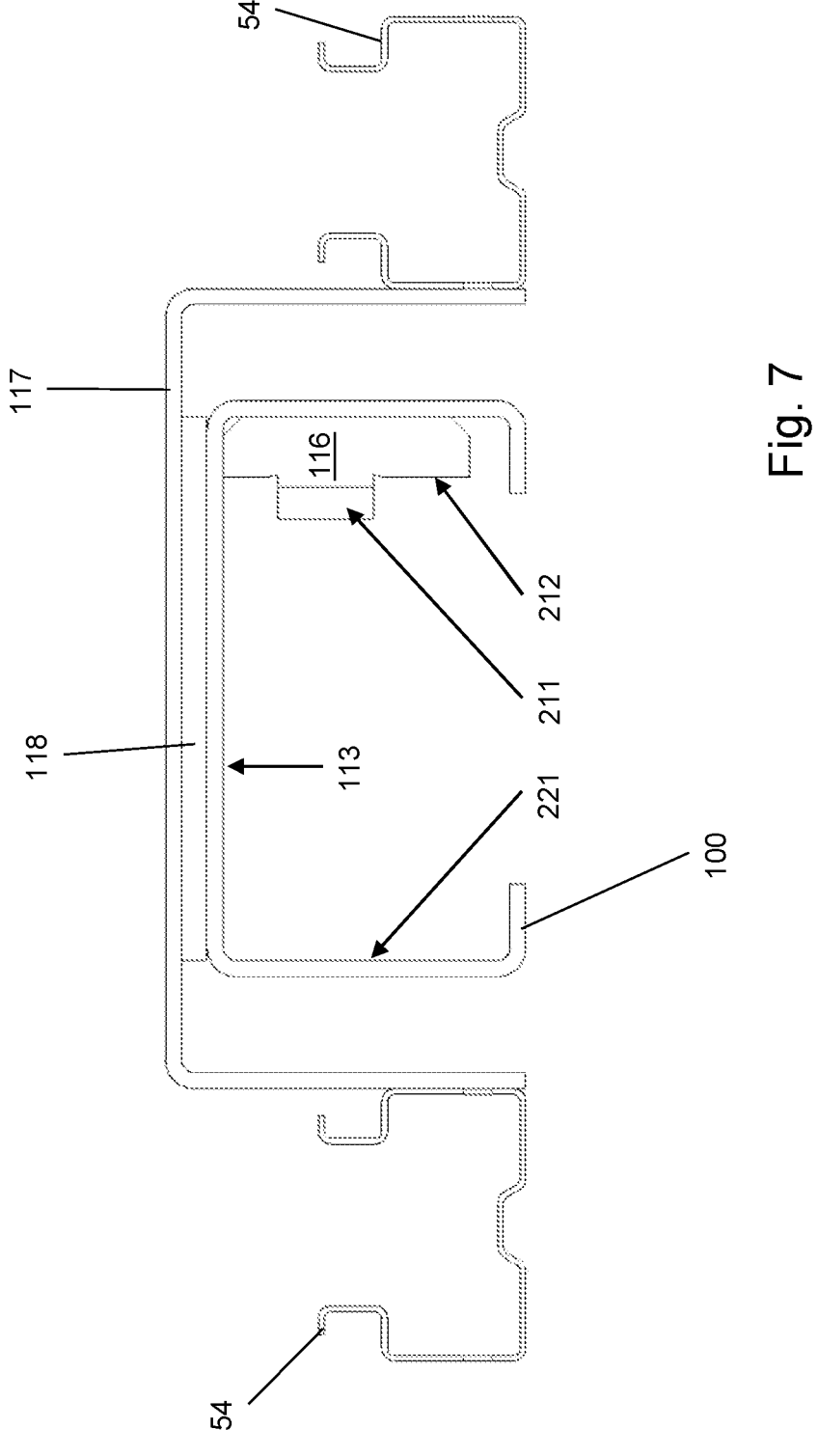
FIG. 7 shows schematically how a vertical track is detachably connected to uprights of the automated small parts shuttle racking system according to the invention.

FIG. 7 shows how the vertical track 100 is detachably connected to two uprights 54. Between the two uprights 54, brackets 117 are mounted, e.g. every 1.5 m along the height of the uprights. The U-shaped brackets 117 are connected to the uprights 54 using e.g. bolts and nuts. The vertical profile 100 is connected to the brackets 117 having a vibration damping sheet 118, like a gummi-sheet, between the bracket 117 and the vertical track 100. Suitable apertures are foreseen such that the position of the vertical track 100 can be adjusted in horizontal and vertical direction, thereby allowing to align the vertical track 100 within narrow tolerances to the foreseen position. Optionally shim plates are used to align the vertical track 100.

It is to be understood that although preferred embodiments and/or materials have been discussed for providing embodiments according to the present invention, various modifications or changes may be made without departing from the scope and spirit of this invention.

The invention claimed is:

1. An automated small parts shuttle racking system comprising a multitude of rows of racks, between which one or more aisles are provided, said aisle being adapted to have a shuttle propelling in a horizontal propelling direction, said racks comprising uprights, said racking system further comprising more than one horizontal tracks and one or more vertical tracks, wherein one or more of said vertical tracks is detachably connected to at least one upright, and is independently adjustable in view of said at least one upright; and the vertical tracks comprising at least a first and a second, mutually opposite wall, the first wall being adapted to enable the vertical propelling of the shuttle along said first wall, the first and second wall being adapted to receive pressure from said shuttle while vertically propelling, and are adapted to guide said shuttle while vertically propelling;

wherein the first and second mutually opposed walls form part of a profile;

wherein said first wall comprises a profiled surface adapted to receive a vertical propelling wheel of the shuttle;

wherein between each of the vertical tracks and the at least one upright detachably connected to this vertical track vibration damping material is provided wherein said horizontal tracks are connected to the vertical tracks, wherein the horizontal tracks are free of connection with the at least one upright to which the vertical track is detachably connected, wherein between the vertical tracks and the horizontal tracks vibration damping material is provided.

2. The automated small parts shuttle racking system according to claim 1, said profile of said vertical tracks comprises a third wall adapted to limit movement of the shuttle in a horizontal direction perpendicular to the horizontal propelling direction in the aisle.

3. The automated small parts shuttle racking system according to claim 1, wherein said first and/or second wall is adapted to limit movement of the shuttle in a horizontal direction perpendicular to the horizontal propelling direction in the aisle.

4. The automated small parts shuttle racking system according to claim 1, wherein in between the horizontal tracks and the racks, levelling means are provided to adjust a position of the horizontal tracks.

5. The automated small parts shuttle racking system according to claim 1, wherein two horizontal tracks are connected to a vertical track, each at one side of the vertical track, wherein outer ends of the horizontal tracks define a single gap having a width of at most 50 mm.

6. The automated small parts shuttle racking system according to claim 1, wherein at outer ends of the horizontal tracks, the horizontal tracks are downwards inclined or with a rounded edge.

7. The automated small parts shuttle racking system according to claim 1, wherein the horizontal tracks are provided at different levels in the aisle with at least two or more horizontal tracks at a same level, and wherein lowermost horizontal tracks in the rack system abut one to the other in the horizontal propelling direction.

8. The automated small parts shuttle racking system according to claim 1, wherein the horizontal tracks used for entering and leaving the aisle are provided with a ramp aligned to an entry level of the aisle.

9. The automated small parts shuttle racking system according to claim 1, wherein the racking system further comprises one or more mezzanine constructions in front and/or back of the aisle of the racking system for the shuttle entering or leaving the aisle.

10. An automated small parts shuttle racking system comprising a multitude of rows of racks, between which one or more aisles are provided, said aisle being adapted to have a shuttle propelling in a horizontal propelling direction, said racks comprising uprights, said racking system further comprising more than one horizontal tracks and one or more vertical tracks, wherein one or more of said vertical tracks is detachably connected to at least one upright, and is independently adjustable in view of said at least one upright; and the vertical tracks comprising at least a first and a second, mutually opposite wall, the first wall being adapted to enable the vertical propelling of a shuttle along said first wall, the first and second wall being adapted to receive pressure from said shuttle while vertically propelling, and are adapted to guide said shuttle while vertically propelling, wherein between each of the vertical tracks and the at least one upright detachably connected to this vertical track vibration damping material is provided wherein said horizontal tracks are connected to the vertical tracks, wherein the horizontal tracks are free of connection with the at least one upright to which the vertical track is detachably connected, wherein between the vertical tracks and the horizontal tracks vibration damping material is provided.

11. The automated small parts shuttle racking system according to claim 10, wherein in between the horizontal tracks and the racks, levelling means are provided to adjust a position of the horizontal tracks.

12. An automated small parts shuttle racking system comprising:

a multitude of rows of racks, between which one or more aisles are provided, said aisle being adapted to have a shuttle propelling in a horizontal propelling direction, said racks comprising uprights, and more than one horizontal tracks and one or more vertical tracks, wherein one or more of said vertical tracks is detachably connected to at least one upright, and is independently adjustable in view of said at least one upright; and the vertical tracks comprising at least a first and a second, mutually opposite wall, the first wall being adapted to enable the vertical propelling of a shuttle along said first wall, the first and second wall being adapted to receive pressure from said shuttle while vertically propelling, and are adapted to guide said shuttle while vertically propelling wherein the first and second mutually opposed walls form part of a profile;

wherein said first wall comprises a profiled surface adapted to receive a vertical propelling wheel of a shuttle;

wherein between each of the vertical tracks and the at least one upright detachably connected to this vertical track vibration damping material is provided, wherein brackets are mounted on the uprights along a height of the uprights, said brackets connecting said vertical tracks to the at least one upright.

13. The automated small parts shuttle racking system according to claim 12, wherein the second wall has a protrusion directed inwards a recess of the profile.

* * * * *